(12) United States Patent
Ess et al.

(10) Patent No.: US 6,946,541 B2
(45) Date of Patent: Sep. 20, 2005

(54) COMPOSITION BASED ON RENEWABLE RAW MATERIALS

(75) Inventors: Milko Ess, Freiburg/Neckar (DE); Bernd Kastl, Bietigheim-Bissingen (DE); Siegfried Reichert, Erligheim (DE); Hanns-Jörg Mauk, Mundelsheim (DE)

(73) Assignee: DLW Aktiengesellschaft, Bietigheim-Bissingen (DE)

( * ) Notice: Subject to any disclaimer, the term of this patent is extended or adjusted under 35 U.S.C. 154(b) by 0 days.

(21) Appl. No.: 10/296,520

(22) PCT Filed: May 21, 2001

(86) PCT No.: PCT/EP01/05823

§ 371 (c)(1),
(2), (4) Date: Mar. 22, 2004

(87) PCT Pub. No.: WO01/90211

PCT Pub. Date: Nov. 29, 2001

(65) Prior Publication Data

US 2004/0152864 A1 Aug. 5, 2004

(30) Foreign Application Priority Data

May 24, 2000 (EP) ............................................ 00110902
Aug. 3, 2000 (EP) ............................................ 00116781

(51) Int. Cl.$^7$ ......................... C08G 59/42; C08G 63/00
(52) U.S. Cl. ....................................... 528/365; 525/533
(58) Field of Search ......................... 528/297; 525/533, 525/365

(56) References Cited

U.S. PATENT DOCUMENTS

| | | | | |
|---|---|---|---|---|
| 3,201,360 A | | 8/1965 | Proops et al. | 260/18 |
| 3,485,573 A | * | 12/1969 | Heyden | 8/94.23 |
| 3,770,675 A | * | 11/1973 | Taft | 525/111.5 |
| 3,943,082 A | * | 3/1976 | Smith et al. | 523/427 |
| 4,119,593 A | | 10/1978 | Smith et al. | 260/18 |
| 4,694,033 A | * | 9/1987 | van der Linde | 523/437 |
| 5,324,846 A | * | 6/1994 | Hirshman et al. | 554/121 |
| 6,150,436 A | * | 11/2000 | Kastl et al. | 523/440 |
| 2001/0023276 A1 | * | 9/2001 | Schoenfeld | 525/107 |

FOREIGN PATENT DOCUMENTS

| | | | | |
|---|---|---|---|---|
| DE | 196 27 165 A1 | 7/1996 | | C08L/91/00 |
| WO | WO 98/28356 | 7/1998 | | C08G/59/14 |

* cited by examiner

Primary Examiner—Robert Sellers
(74) Attorney, Agent, or Firm—Womble Carlyle Sandridge & Rice, PLLC

(57) ABSTRACT

The present invention relates to a composition based on renewable raw materials which is particularly characterized by containing at least one tin-containing compound, an article made thereof as well as a process for the preparation of such an article. The composition according to the present invention exhibits an increased curing rate, i.e. a shortened "incubation time", compared to those compositions based on renewable raw materials currently available in the prior art. Furthermore, the composition according to the present invention can advantageously use particularly in casting and rotational casting processes, respectively.

15 Claims, 1 Drawing Sheet

COMPOSITION BASED ON RENEWABLE RAW MATERIALS

This application claims priority under 35 U.S.C. §119(b) to European Application Serial No. 00 110 902.4, filed on May 24, 2000 and European Application Serial No. 00 116 781.6, filed Aug. 3, 2000, and PCT Application Serial No. PCT/EP01/05823, filed on May 21, 2001 under 35 U.S.C. §363.

The present invention relates to a composition based on renewable raw materials which is particularly characterized by containing at least one tin-containing compound, an article made thereof as well as a process for the preparation of such an article. The composition according to the present invention exhibits an increased curing rate, i.e. a shortened "incubation time", compared to those compositions based on renewable raw materials currently available in the prior art. Furthermore, the composition according to the present invention can advantageously used particularly in casting and rotational casting processes, respectively.

Compositions based on renewable raw materials are frequently used for coating masses of planar structures as it is e.g. known from DE-A41 35 664. The coating masses consist of a combination of epoxidation products of esters of unsaturated fatty acids and partial esters of polycarboxylic acids with polyether polyols as well as a hydrophobing agent. These coating masses are particularly used for the production of floor coverings.

Spreadable coating masses for the production of planar structures based on renewable raw materials are known from WO 96/15203.

However, for these currently available compositions based on renewable raw materials it is common that their processing characteristics are unsufficient in terms of their "incubation time". To this extent, the "incubation time" of the known compositions based on renewable raw materials lies in the range of 20 minutes or above at a temperature of 70° C. As a consequence, the currently available compositions based on renewable raw materials are not suited for the production of three-dimensional articles due to their disadvantageously prolonged "incubation time" and, thus, they are insufficient for processing methods like casting and rotational casting, respectively.

Therefore, it is an object of the present invention to provide a new composition based on renewable raw materials which is characterized by good processing characteristics, particularly a reduced "incubation time" to enable a rapid processing of said composition, thereby allowing the production of e.g. three-dimensional articles made thereof in an easy and economically advantageous manner, particularly by casting and rotational casting, respectively. Further, articles produced in this way should exhibit excellent material properties.

This object is solved by the embodiments characterized in the claims. In particular, there is provided a composition comprising the reaction product of at least one dicarboxylic acid or one polycarboxylic acid or derivatives thereof or a mixture thereof with at least one epoxidation product of a carboxylic acid ester or a mixture of said epoxidation product in the presence of at least one tin-containing compound.

The composition according to the present invention exhibits a shortened "incubation time" and "reaction time", respectively, over the currently available compositions based on renewable raw materials. The term "incubation time" as used herein means the time period from the beginning of adding the cross-linking agent, i.e. the at least one dicarboxylic acid or one polycarboxylic acid or derivatives thereof or a mixture thereof constituting the specific reaction product of which the composition of the present invention is comprised, until the moment when the viscosity of the mass begins to increase, i.e. a rising in a diagram wherein the viscosity of the mass, for example measured by a conventional Haake viscosimeter, is plotted against the time. The specific use of a tin-containing compound surprisingly gives rise to a remarkably increased curing rate. The increased curing rate can be proven by measuring the gel point according to ASTM D 4473 using dynamic-mechanical oscillation instrumentation for reporting the cure behaviour of such compositions. For example, this particular characteristic advantageously enables the processing of the composition according to the present invention by casting and rotational casting, respectively.

Figure 1:
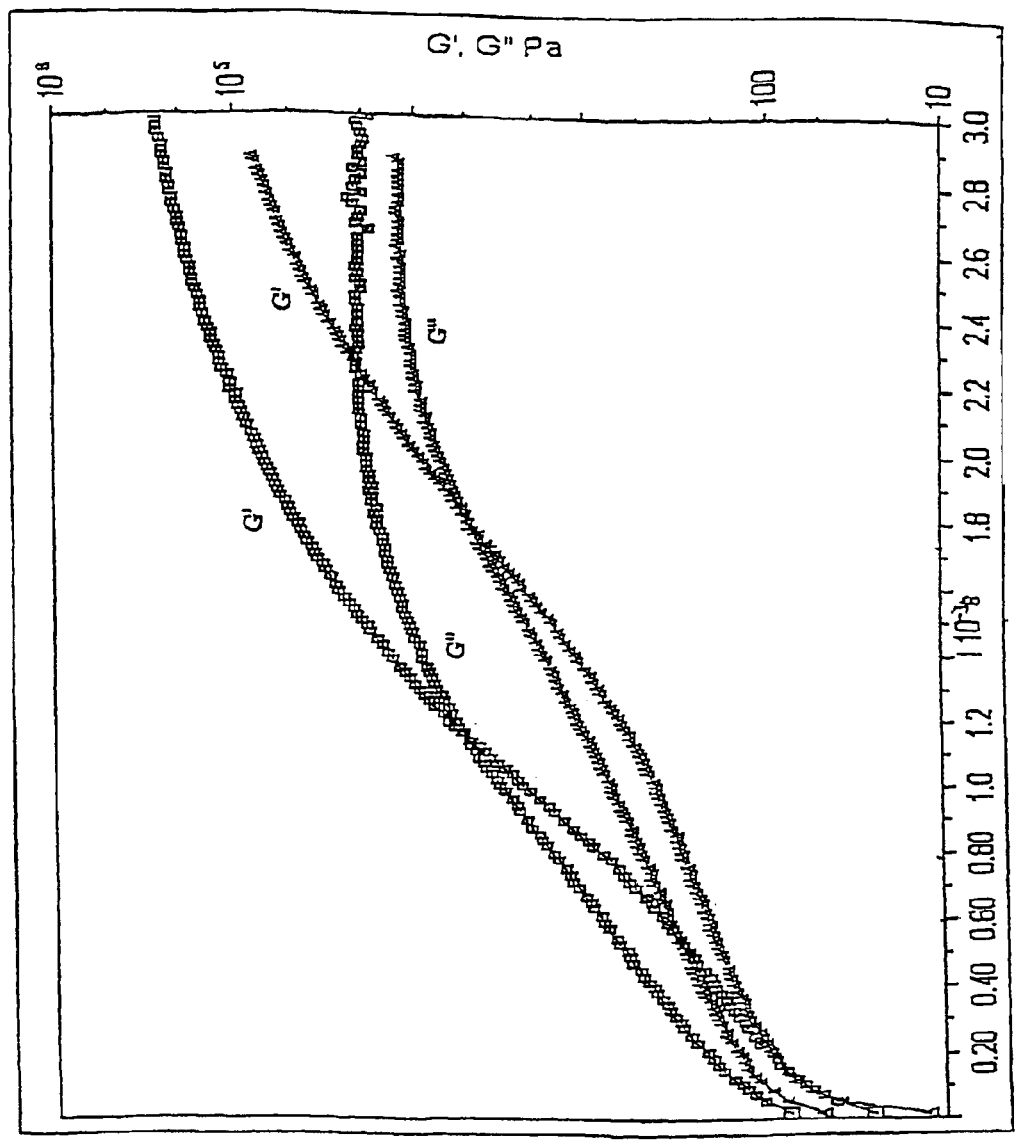
FIG. 1 shows the result of the measurements, wherein the elastic and viscous moduli of specimens made of a composition according to the present invention and a currently available prior art composition based on renewable raw materials, respectively, are plotted as a function of time to determine the gel point according to ASTM D 4473 in order to evaluate the cure behaviour. According to ASTM D 4473 the intersection of the elastic (G') and viscous (G") moduli, where tan delta=(G"/G')=1, has been defined as an indication of the gel point of the respective specimens.

In a preferred embodiment of the present invention, the tin-containing compound is selected from the group consisting of organotin compounds, tin salts and tin chelates. Preferred examples of the tin-containing compounds are organotin (II) compounds of $C_6$ to $C_{18}$ aliphatic or cycloaliphatic monocarboxylic acids, such as for example stannous diethylhexanoate, stannous dioctoate, or stannous dilaureate, or organotin (IV) compounds of $C_6$ to $C_{18}$ aliphatic or cycloaliphatic monocarboxylic acids, such as for example dibutyltin dilaureate or tributyltin octoate.

Preferably, the tin-containing compound(s) is (are) present in an amount ranging from 0.01 to 5 wt.-%, more preferably 0.01 to 1 wt.-%, based on the total amount of said composition.

Maleic acid, itaconic acid, fumaric acid, succinic acid, methylsuccinic acid, malic acid, furandicarboxylic acid, phthalic acid, tartaric acid, or citraconic acid, or a mixture thereof containing at least two of these acids can preferably be used as dicarboxylic acid. Acids with three or more carboxyl groups such as, for example, citric acid, aconitic acid and trimellitic acid can preferably be used as polycarboxylic acids.

Anhydrides or partial esters or derivatives having at least one free carboxyl group can be used as derivatives of the dicarboxylic acids or polycarboxylic acids. The alcohol component of the partial esters is not subject to special restriction, but polyols such as dipropylene glycol, propanediols, butanediols, hexanediols, hexanetriols, pentaerythritol or glycerin are preferably used as alcohol component.

In a preferred embodiment of the present invention, there is provided a composition comprising the reaction product of at least one epoxidation product of a carboxylic acid ester or a mixture of said epoxidation product with a mixture of a partial ester of a di- or polycarboxylic acid and a polycarboxylic acid having three or more carboxylic acid groups, in the presence of at least one tin-containing compound.

In an especially preferred embodiment, a mixture of a partial ester of maleic anhydride and dipropylene glycol together with citric acid is used as crosslinking agent. For, example, the content of citric acid is up to 50 percent by weight, more preferably up to 25 percent by weight, relative to the total quantity of crosslinking agent.

The epoxidation product of a carboxylic acid ester of which the composition of the present invention is further comprised, preferably contains more than one epoxy group per molecule.

Epoxidized linseed oil, epoxidized soybean oil, epoxidized castor oil, epoxidized rape-seed oil or vernonia oil or a mixture thereof containing at least two of these epoxidized products can preferably be used as epoxidation product of a carboxylic acid ester. The afore-defined alcohols of the partial esters, such as, for example, dipropylene glycol, propanediols, butanediols, hexanediols, hexanetriols, pentaerythritol, or glycerin can also be used as alcohol component of these carboxylic acid esters. The carboxylic acid component is not subject to special restriction.

In the reaction product of which the composition of the present invention is comprised, the quantities by weight of crosslinking agent and epoxidation product are each preferably 5 to 85 percent by weight, relative to the total quantity of the composition.

Depending on the specific purposes, the composition according to the present invention can further comprise at least one additive selected from the group consisting of fillers, pigments, expanding agents, hydrophobing agents and auxiliary substances. Preferably, the filler is wood dust, chalk, cellulose, lignin or cork dust, or a mixture thereof containing at least two of these substances. The auxiliary substance can, for example, be selected from the group consisting of tall oils, synthetic or natural resins, and siccatives.

In a preferred embodiment, the composition according to the present invention preferably comprises 15 to 98 percent by weight of the reaction product and 2 to 85 percent by weight of at least one filler, relative to the total quantity of the composition.

A further subject of the present invention is an article made of the composition as specified hereinbefore. The article according to the present invention can have any desired shape, depending on the specific purposes only.

Furthermore, the composition according to the invention can also be prepared in the form of prepolymers, in which either the crosslinking agent or the epoxidation product can be present in deficiency. Such prepolymers are stable in storage and exhibit partly thermoplastic properties. The weight ratio of crosslinking agent to epoxidation product in these prepolymers preferably lies in the range from 10:1 to 1:20. These prepolymers of the composition according to the present invention are then converted into the completely crosslinked material in a subsequent step only, optionally with the addition of the component present in deficiency as well as optionally further additives. Such prepolymers made of the composition according to the present invention can particularly be used in injection molding processes when for example pellets composed of those prepolymers are melted by the combined action of external heating and internal friction caused by the transport of the material by single or twin screws.

Additionally, there is provided a process for the preparation of such an article, comprising the steps of
(a) compounding at least one dicarboxylic acid or a polycarboxylic acid or derivatives thereof or a mixture thereof and at least one epoxidation product of a carboxylic acid ester or a mixture of said epoxidation products in the presence of at least one tin-containing compound as defined above,
(b) shaping the compounded mixture obtained in step (a), and
(c) curing the shaped product obtained in step (b).

Surprisingly, it has turned out that by use of a tin-containing compound, a mouldable mass having a remarkably reduced "incubation time" and, thus, a remarkably increased curing rate, is obtained that can be easily processed into shaped articles. Preferably, the "incubation time" in said process is less than 10 minutes.

The curing in step (c) can be carried out
(i) thermally and/or
(ii) by UV radiation in the presence of at least one UV initiator and/or
(iii) by electron radiation optionally in the presence of at least one UV initiator and/or
(iv) by IR radiation.

When the curing is carried out by UV radiation, the UV initiators used may be radical or cationic UV initiators, or a mixture of said types of UV initiators. Preferred examples of radical UV initiators are benzophenone, benzophenone derivatives, phosphine oxides, $\alpha$-morpholino ketones, quinone, quinone derivatives or $\alpha$-hydroxy ketones, or mixtures thereof. Preferred examples of cationic UV initiators are triarylsulfonium salts which may be of one type or a mixture of different triarylsulfonium salts, or diaryliodonium salts, or mixtures thereof. Said UV initiators may be present, for example, in an amount up to 8% by weight, preferably 0.1 to 3% by weight, based on the composition. In one embodiment, besides the UV initiator, at least one photosensitizer may be present, such as e.g. compounds based on anthracene, perylene or thioxanthene-9-one, which is able to activate the UV initiator and to enhance the effectiveness thereof, thereby reducing the concentration of the UV initiator. UV radiation employed is, generally, within the usual range, i.e. 200 nm to 380 nm. IR radiation employed is, generally, within the usual range, for example, 760 nm to 0.5 mm.

In a preferred embodiment, the composition according to the present invention can be processed by casting and rotational casting processes, respectively, to obtain respective articles made thereof, but injection moulding is also possible.

Casting requires liquid compounds or prepolymers which are polymerized or crosslinked after being poured into open forms. Accordingly, when performing a casting process by using the composition according to the present invention, said composition can be processed directly to finished articles at elevated temperatures (hot-curing systems) or room temperatures (cold-curing systems). Thick-walled articles, embeddings, sheets, blocks, and rods made of the composition according to the present invention can be produced by such a process. Adequate temperature regulation is necessary to avoid thermal stresses. Apart from metal moulds with cooling channels, simpler moulds made of sheet metal, wood, ceramic, or glass can be used. To guarantee ease of release and to ensure smooth moulding surfaces, those parts of the mould that come in contact with the composition of the present invention should be sealed by coating or impregnating with conventional means known in the art.

Hollow articles made of the composition according to the present invention can be produced by e.g. rotational casting. In this case, only the amount of paste or mass, respectively, to be used is metered to the mould, so that removal of excess mass and postgelation are not necessary. During a heating stage, the mould is rotated about two perpendicular axes, causing uniform wetting of the cavity surface. To achieve optimum distribution of the mould contents, the two axes should be rotated at (usually adjustable) different speeds. The individual process steps (for example, filling and closing the mould, rotating in an oven, cooling, and removal of the moulding) are well-known to a person skilled in the art, and can be performed at separate stations. Such rotational casting processes are well known in the prior art and, for example, described in DE-OS-23 43 045, DE-A-1 454 975 and DE-A1-40 32 540. A rotational casting process using the composition according to the present invention is advantageous due to low investment costs and the ability to manufacture mouldings of various dimensions without pinch or weld seams, virtually free of stresses and with constant wall thicknesses.

For example, particularly when injection molding is desired, the process for the production of the aforementioned article can also be performed as a two-stage process, wherein a prepolymer is first prepared in a first stage by mixing of crosslinking agent and epoxidation product with one of these components in deficiency, together with the specifically used tin-containing compound. For the preparation of the prepolymer from the afore-defined material, either the crosslinking agent or the epoxidation product can be added in deficiency. Then, the weight ratio of crosslinking agent to epoxidation product in the first stage preferably lies in the range from 10:1 to 1:20. Next, the prepolymer obtained in this way can be press-molded and granulated, by which means a granular product is obtained that is stable in storage and is still partly thermoplastic as a result of the composition with one component in deficiency. In the second stage, the partly thermoplastic granular product made of the prepolymer can then be shaped into a desired article and completely crosslinked optionally with the addition of the component present in deficiency in the first stage as well as optionally further additives. Such a two stage process is particularly advantageous when the composition according to the present invention should be processed by injection molding processes to e.g operate on the batch principle.

The present invention is explained in more detail in the following examples.

EXAMPLES

Two compositions according to the present invention as well as a conventional composition based on renewable raw materials and a conventional composition based on renewable raw materials containing a Ba siccative but the latter compositions both without a tin containing compound, were prepared and evaluated. The following Table 1 shows the influence of the specifically used tin-containing compound on the curing rate/"incubation time" measured at a temperature of 70° C.:

TABLE 1

| composition/ components | conventional composition based on renewable raw materials (Comp. Example) | Ba siccative | composition according to the present invention (Example 2) | composition according to the present invention (Example 3) |
| --- | --- | --- | --- | --- |
| basic formulation | 58.80 | 58.80 | 58.80 | 58.80 |
| Power-Ateval | 25.00 | 25.00 | 25.00 | 25.00 |
| cerium 10 | 1.00 | — | — | — |
| cobalt 10 | 0.10 | 0.10 | 0.10 | — |
| barium 12,5 | — | 2.00 | | |
| tin 28 | — | — | 0.05 | 0.05 |
| zinc 12 | — | — | — | 0.50 |
| "incubation timed" (min) | 20 | 20 | <10 | 10 | basic formulation:
51.0 g epoxidized linseed oil
2.0 g highly disperse silicic acid
3.0 g poly(methyl methacrylate)
2.0 g linseed oil
0.8 g defoamer
Power-Ateval: 25% by weight solution of citric acid in a partial ester of maleic acid anhydride and dipropylene glycol The siccatives used are each octoates of the metalls as indicated. The respective numbers represent the % metall content.

"Incubation time" means the time period from the beginning of adding the cross-linking agent until the moment when the viscosity of the mass begins to increase.

Furthermore, the viscoelastic properties of the above Example 2 and the Comparative Example were measured by using a Bohlin measuring instrument under oscillating frequency conditions of 2 Hz at 70° C. The elastic (G') and viscous (G") moduli (in Pascal (Pa)) are measured in shear as a function of time (in seconds). FIG. 1 shows the result of measurements, where the moduli are plotted as a function of time. The plot of the cure behaviour is evaluated according to ASTM D 4473, wherein the intersection of the elastic (G') and viscous (G") moduli, where tan $\delta=(G''/G')=1$ with $\delta$ being the phase angle, has been defined as an indication of the gel point of the respective specimen. The results are given in the following Table 2.

TABLE 2

| | Comparative Example | Example 2 |
| --- | --- | --- |
| Gel point (min) | 30 | 19 |

As can be taken from Table 2, Example 2 that is a composition according to the present invention, reaches the gel point measured according to ASTM D 4473 much quicker than the respective Comparative Example that is a composition based on renewable raw material currently available in the prior art. Accordingly, Example 2 exhibits an increased curing rate, when compared with said Comparative Example.

As can be seen from the above Tables 1 and 2, the addition of a tin-containing compound surprisingly gives rise to an increased curing rate, i.e. a shortened "incubation time", when compared to those compositions based on renewable raw materials currently available in the prior art, even when such compositions contain a Ba siccative. Therefore, when applying casting processes or rotational casting processes, the requirement of a more rapid curing, i.e. a shorter "incubation time", to attain a more economical production is advantageously fulfilled by the compositions according to the present invention.

What is claimed is:

1. A composition comprising the reaction product of:
   a. a mixture of:
      i) a partial ester of a di- or polycarboxylic acid and
      ii) a polycarboxylic acid having three or more carboxylic acid groups;
   b. at least one epoxidation product of a carboxylic acid ester or a mixture of said epoxidation product; and
   c. at least one tin-containing compound.

2. The composition according to claim 1, wherein the tin-containing compound is selected from organotin compounds, tin salts, or tin chelates.

3. The composition according to claim 2, wherein the tin-containing compound is an organotin (II) compound of $C_6$ to $C_{18}$ aliphatic or cycloaliphatic monocarboxylic acids or an organotin (IV) compound of $C_6$ to $C_{18}$ aliphatic or cycloaliphatic monocarboxylic acids.

4. The composition according to claim 1, wherein the tin-containing compound is present in an amount ranging from 0.01 to 5 wt.-% based on the total amount of said composition.

5. The composition according to claim 1, wherein the dicarboxylic acid is maleic acid, itaconic acid, fumaric acid, succinic acid, methylsuccinic acid, malic acid, furandicarboxylic acid, phthalic acid, tartaric acid, or citraconic acid, or a mixture thereof containing at least two of these acids.

6. The composition according to claim 1, wherein the polycarboxylic acid is selected from citric acid, aconitic acid or trimellitic acid.

7. The composition according to claim 1, wherein an alcohol component of the partial ester is a polyol.

8. The composition according to claim 7, wherein the polyol is dipropylene glycol, a propanediol, a butanediol, a hexanediol, a hexanetriol, pentaerythritol or glycerin, or a mixture thereof containing at least two of these polyols.

9. The composition according to claim 1, wherein the mixture of a partial ester of a di- or polycarboxylic acid and a polycarboxylic acid having three or more carboxylic acid groups is a mixture of a partial ester of maleic acid anhydride and dipropylene glycol with citric acid.

10. The composition according to claim 1, wherein the epoxidation product of a carboxylic acid ester contains more than one epoxy group per molecule.

11. The composition according to claim 1, wherein the epoxidation product of a carboxylic acid ester is epoxidized linseed oil, epoxidized soybean oil, epoxidized castor oil, epoxidized rape-seed oil or vernonia oil, or a mixture thereof containing at least two of these epoxidized products.

12. The composition according to claim 1, wherein the composition further comprises at least one additive selected from fillers, pigments, expanding agents, hydrophobing agents, or auxiliary substances.

13. The composition according to claim 12, wherein the filler is wood dust, chalk, cellulose, lignin or cork dust, or a mixture thereof containing at least two of these substances.

14. The composition according to claim 12, wherein the auxiliary substance is selected from tall oils, synthetic or natural resins, or siccatives.

15. An article made of the composition according to claim 1.

* * * * *